April 1, 1924.
L. J. LÉCHENAUX
1,488,990
AUTOMATICALLY OPERATED CHANGE SPEED GEAR
Filed March 29, 1922   5 Sheets-Sheet 1
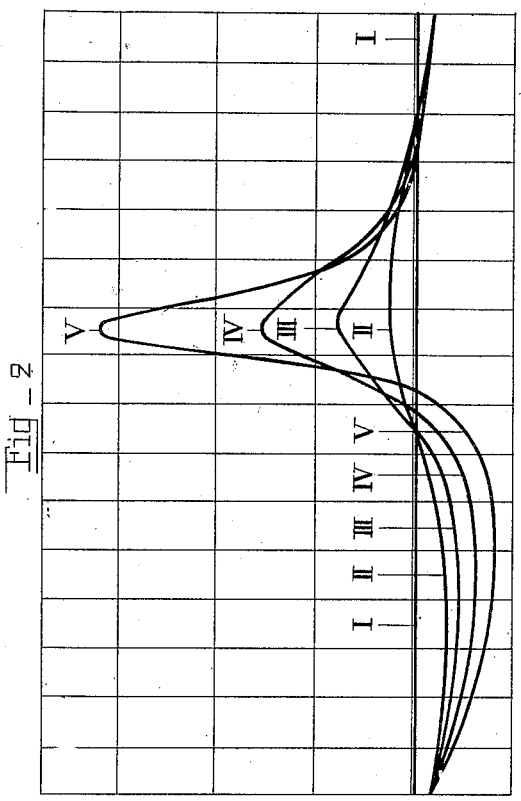
Fig. 2
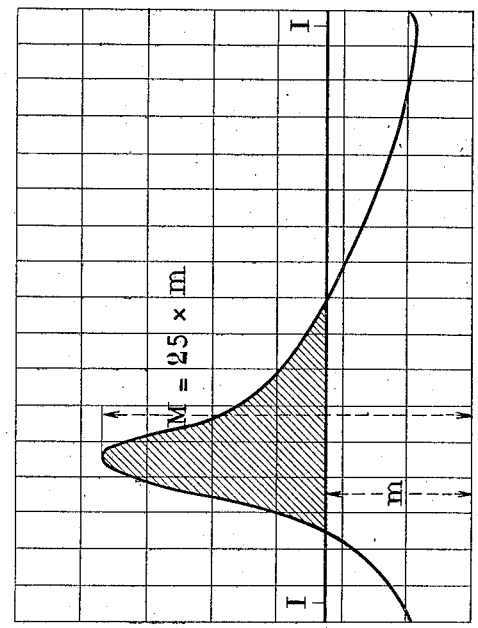
Fig. 3
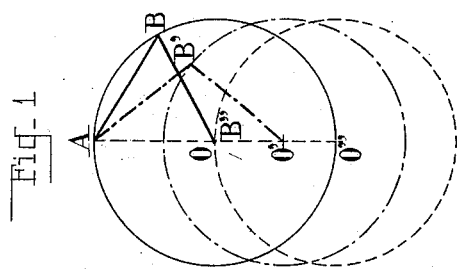
Fig. 1
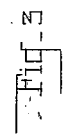
Inventor:
L. J. Léchenaux
By
Lawrence Langner
Attorney

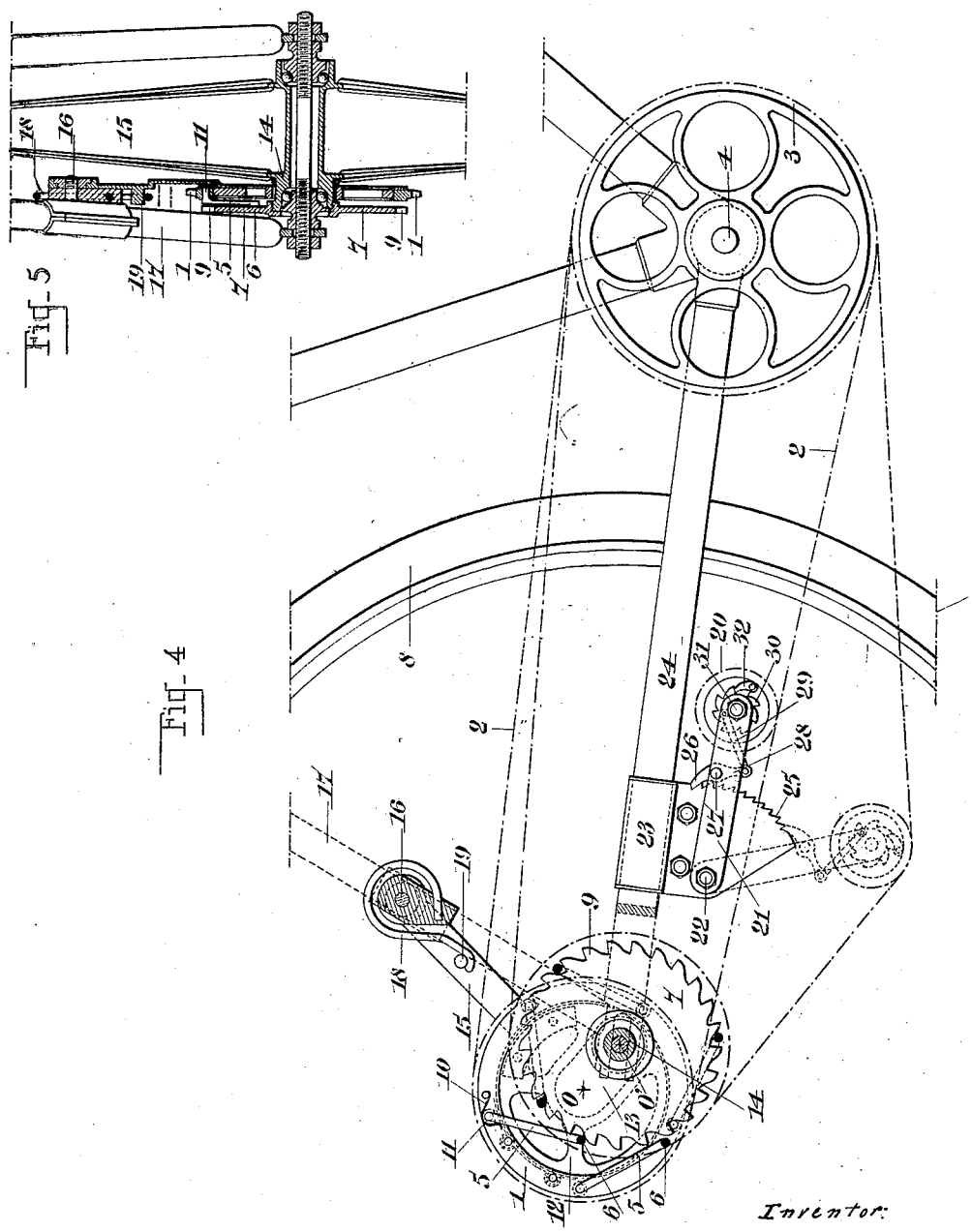

April 1, 1924. 1,488,990
L. J. LÉCHENAUX
AUTOMATICALLY OPERATED CHANGE SPEED GEAR
Filed March 29, 1922 5 Sheets-Sheet 3

Inventor:
L. J. Lechenaux
By Lawrence Langner
Atty

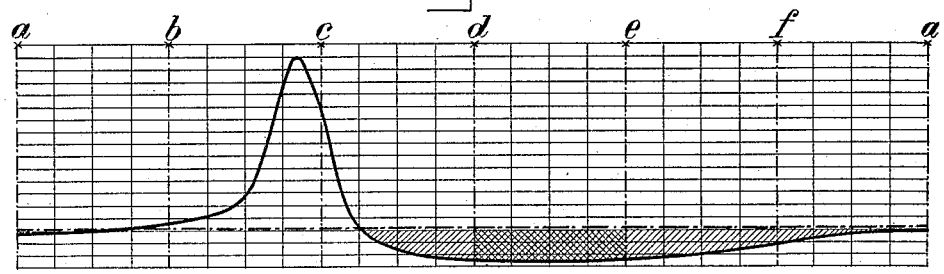
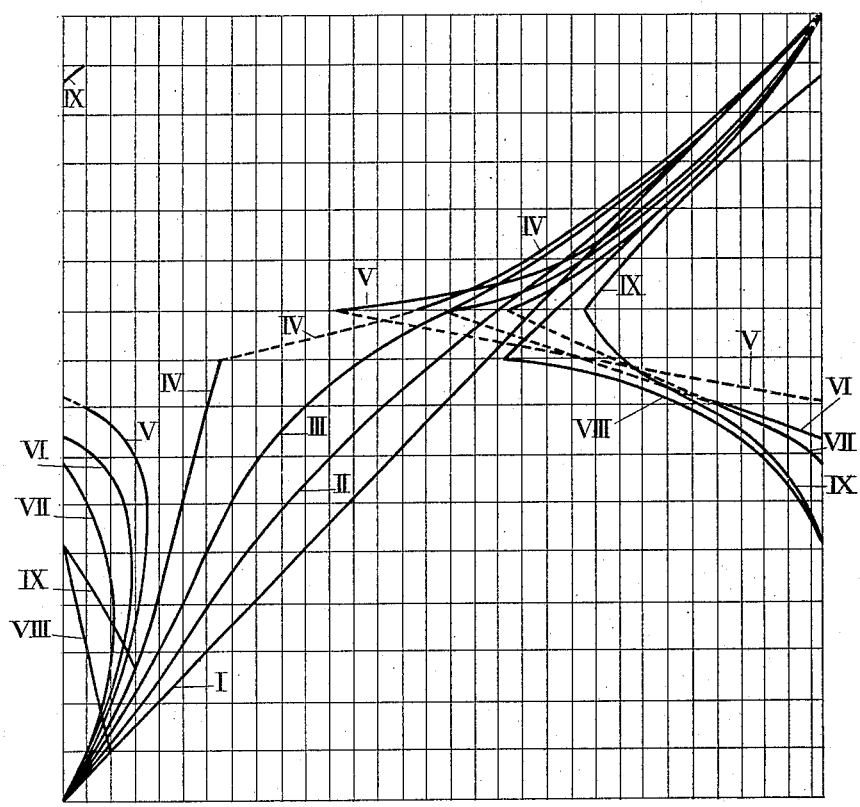

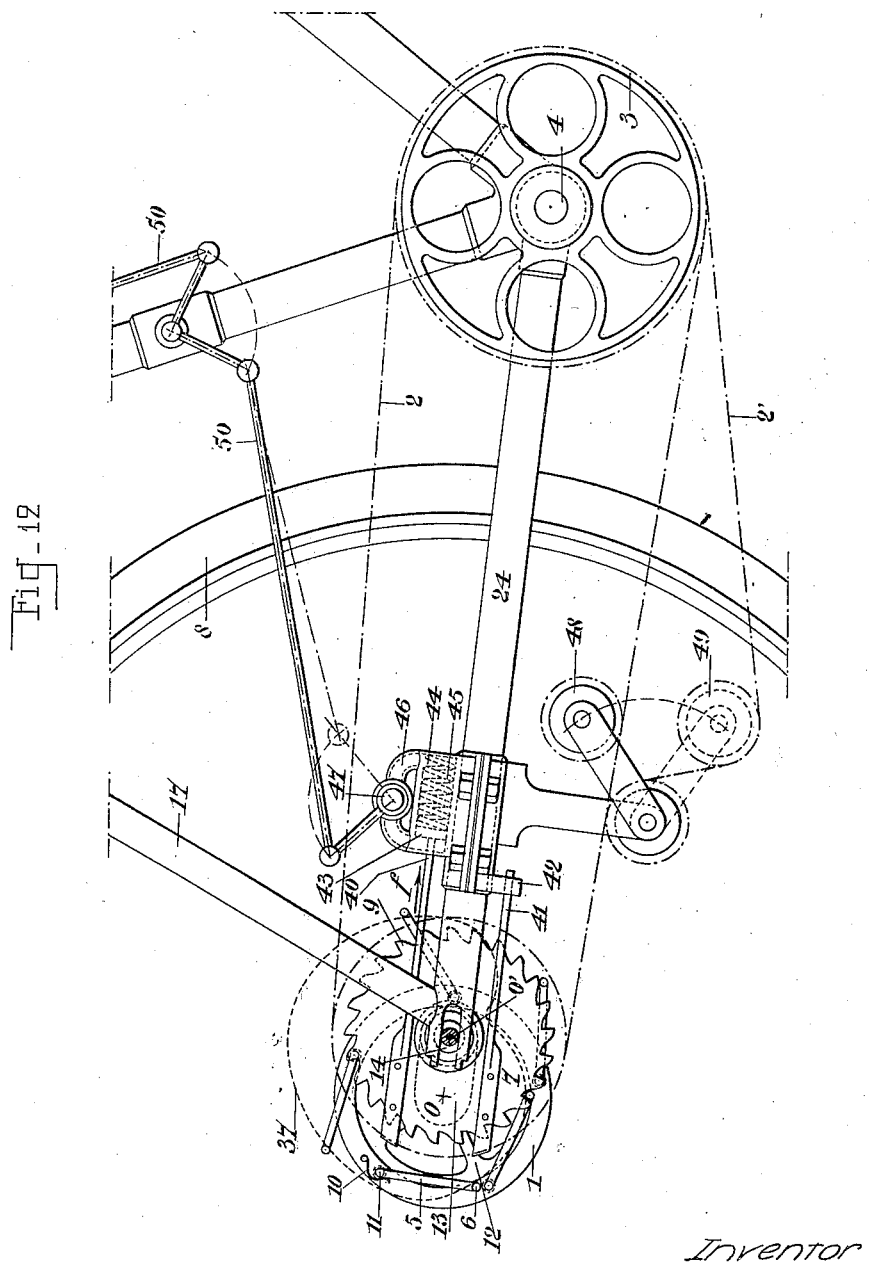

Patented Apr. 1, 1924.

1,488,990

UNITED STATES PATENT OFFICE.

LOUIS JOSEPH LÉCHENAUX, OF PARIS, FRANCE.

AUTOMATICALLY-OPERATED CHANGE-SPEED GEAR.

Application filed March 29, 1922. Serial No. 547,881.

*To all whom it may concern:*

Be it known that I, LOUIS JOSEPH LÉCHENAUX, citizen of the French Republic, residing 5 Rue Legraverend, at Paris, in the Department of Seine, France, have invented a new and useful Automatically-Operated Change-Speed Gear, of which the following is a specification.

The invention consists in an automatically operated change speed gear which allows of all speeds to be obtained between zero and an upper limit determined for each particular application of the arrangement and establishes a constant relation, independent of the driver of the machine, between the motive power and the resistance to be overcome, Fig. 1 is a diagram illustrating the theoretical operation of the apparatus.

Figs. 2, 3, 7 and 11 are speed diagrams corresponding to the different positions of the apparatus.

Fig. 4 is a view in elevation of the speed change assembly applied to a bicycle.

Fig. 5 is a transverse sectional view of the construction illustrated in Fig. 4.

Fig. 12 is a view in elevation of a modification.

Figure 6:
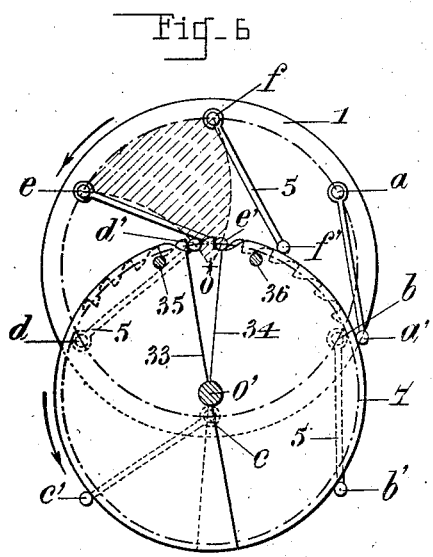
Figs. 6, 8, 9 and 10 are detail views of the construction permitting the utilization of only certain of the speeds which the apparatus is capable of giving and applicable to the forms of invention shown in Figures 4 and 12.

The arrangement depends on the practical application of the following principle:

If a point A (Fig. 1) moves at a uniform speed on the circumference of a circle O (called the driving circle) and is connected to a second point B by articulated arms AB and BO each of which is equal to the radius of the circle, the point B will traverse the circumference of the centre O at the same speed as the point A. If the centre O is displaced so as to be brought into the position O', the point B' will continue to traverse a circle of which the centre is O' (which may be called the driven circle) and of which the radius is equal to that of the driving circle, but the speed of the point B' will not be equal to that of the point A and it will vary according to the position that this point B' occupies on the driven circle.

The variations of these speeds are represented in Fig. 2 of the accompanying drawings in which five Diagrams I, II, III, IV, V are shown corresponding to the variations in the distance apart of the centres O, O', each of which variations is equal to the fifth part of the radius of the two circles, the abscissæ representing times and the ordinates of the curves speeds. In order to separate the diagrams the scale of the ordinates is double that of the abscissæ.

Diagram I, corresponding to the coincidence of the centres O and O', is a line parallel to the axis of the abscissæ, since in this case the point B is driven at the same speed as the point A. The other diagrams show that the variations of speed in the two directions increase in proportion as the distance between the centres O and O' is greater. This variation of speed will, consequently, be a maximum when the centre of the driven circle is at O'' (Fig. 1), a position in which this circle will pass through the centre O of the driving circle. At this moment the movement becomes indefinite and can be transmitted in either direction.

If the arm AB'', starting from the point A, is drawn in the direction of the driving movement, the point B'' will traverse on the driven circle paths equal to those traversed by the point A on the driving circle; if, on starting, there is a resistance at the joints of A or B, the point A will describe a circle of centre O, whilst the point B'' will remain fixed.

The diagrams of Fig. 2 correspond to a connecting arm AB of which the length is equal to the radius of the driving and driven circles. This arm might, however, have a greater length which would allow the centres of the circumference to be placed further apart. This arrangement gives rise in the speed diagrams to an interesting peculiarity which is shown in Fig. 2.

The nine diagrams of this figure correspond to nine positions of the centres of the driving and driven circles, starting with their coincidence and continuing by progressive equal distances of one-fifth of the radius of these circles. In these diagrams the paths traversed by the point B are shown as abscissæ and the times as ordinates on the same scale.

Diagram I corresponds to the diagonal of the square and Diagrams II and III differ little from this diagonal. Diagram IV has a discontinuity, but the possible speeds are interesting. Starting from diagram V the retrograde movement is sharply defined. The first inflection of the speed curve is produced very gradually and the second, on the other hand, rapidly. When the distance apart of the centres of the two circles is equal to the length of the driving arm, there will be no movement, the discontinuity becoming equal to the circumference of the circle.

It follows from the preceding explanations that the system according to the invention can be applied in two different manners.

The variations of speed may be utilized on the same part of the driven circle as a function of a distance of the centres of the two circles, or for a definite position of the centres, the variations of speed may be obtained around the driven circle.

In Figs. 3, 4 and 5 an example of the practical application of the first of these two methods is shown for controlling the speed of a bicycle.

In this example the maximum distance apart of the centres of the driving circle (effected by the chain controlled by the pedal wheel) and of the driven circle (keyed on the hub of the rear wheel of the bicycle) has been determined so that the maximum gear ratio is equal to 2·5; the speed diagrams follow the curve shown in Fig. 3.

The driving circle I, of centre O, is constantly in engagement, by means of a toothed wheel carried by it, with the chain 2 driven by means of a toothed wheel 3 keyed on the pedal shaft 4. The driving wheel I carries arms 5 of the same length terminating in hooks 6. The driven circle 7 of centre O' is keyed on the hub of the rear wheel 8 of the bicycle and has saw-shaped teeth 9 with which the hooks 6 engage. This particular form of teeth is necessary for the following reason:

When the two centres O and O' do not coincide the arms 5 drive the wheel 7 at a speed which varies according to the part of the circumference of this wheel with which they are in engagement. Under these conditions, if several arms are engaged at the same time at different parts no movement could occur. With the saw-shaped teeth mentioned above, however, the arm engaging at that time with the part having the greatest speed drives the wheel 7, the hooks of the other arms on account of their slower motion sliding on the back of the teeth 9. Springs 10 mounted on the wheel I act also on the arms 5 near their points of articulation II to the said wheel, so as to maintain these arms constantly in contact with the periphery of the wheel 7. Under these conditions at each relative change of position of the centres O and O' the wheel 7 is driven at a different speed and this speed is the greatest in the position shown in the figure.

It should be remarked also that the distance apart of the centres can be modified at any time without stopping the movement of rotation.

This method of application is very simple, but it only utilizes that part of the speed diagrams situated above the straight line I—I, Fig. 2, which corresponds to the coincidence of the centres, that is to say, to the smallest velocity which can be realized.

As regards the number of the driving arms 5, the diagrams of Fig. 2 show that the high speeds above the horizontal line occur during a very short time and consequently a large number of arms, passing in succession over the same points, is necessary in order to obtain a regular secondary speed. On the other hand, the low speeds shown below the horizontal line occur almost regularly during a sufficiently long time and a smaller number of arms is required in order to utilize them practically.

In fact, it is necessary to take into consideration the fact that the ends of the arms should not overlap in two consecutive positions corresponding to the lower speeds, and this necessitates that the number of arms disposed around the driving wheel should not exceed four or five as in the example shown.

The driving wheel 1 is mounted on a stationary disc 12 having a central aperture 13 which allows a movement of translation relatively to the centre O' of the driven wheel 7 keyed on the hub 14 of the rear wheel of the bicycle. The disc 12 is carried by an arm 15 which can oscillate about an axle 16 mounted on the rear fork 17 and normally maintained in the position corresponding to the maximum distance apart of the centres O and O', that is to say in the position corresponding to the maximum speed, by means of a spring 18 which is bent round a pin or lug 19 mounted on the arm 15.

The automatic speed change gear described above is combined with a locking and releasing device operated by back-pedalling in the following manner:

The chain 2 passes over a stretching pulley wheel 20 carried by an arm 21 which can oscillate about an axle 22 carried by a collar 23 fixed on a part 24 of the frame of the machine. This collar carries also a toothed sector 25 with which engages a pawl 26 mounted on an axle 27 and the tail 28 of the pawl is connected by a link 29 to a ratchet wheel 30 mounted freely on the axle 31 of the wheel 20 and engaging with a pawl 32 mounted on this pulley.

The arrangement acts in the following manner:

When the driving circle I rotates at a constant speed and the two centres O and O' do not coincide, the hooks 6 of the driving arms 5 traverse unequal paths on the driven circle 7 during equal times. The variations of speed obtained in this way are shown on the diagram of Fig. 3 in which the equal paths traversed on the driving circle I by the articulated ends II of the arms 5 are shown as abscissæ and the unequal paths traversed by the hooks 6 of these arms are shown as ordinates. The hatched part of this diagram corresponds to the maximum variations of speed which can be used, the minimum of the latter taking place when the centres O and O' coincide, the paths traversed in this case by the hooks 6 on the driven circle being equal and the corresponding diagram being then reduced to a straight line I—I parallel to the axis of the abscissæ.

Normally, the different elements occupy the positions shown in full lines in Fig. 4, that is to say, the centres O and O' of the driving and driven circles occupy, respectively, positions corresponding to their maximum distance apart, which corresponds also to the greatest speed transmitted to the wheel 7.

When resistance occurs, the additional stress produced on the chain 2 has the effect of causing one or other of the centres O and O' to approach and this automatically effects a reduction in the speed.

At this time the action of the spring 18 is annulled, the tension of the spring tending to oppose the benefit of the reduced force to be exerted by the cyclist.

For this purpose the system is automatically locked at a given speed by means of the wheel 20.

On the other hand, in order to unlock the system, it is sufficient to impart a slight back movement to the pedal. The action of the chain 2 on the wheel 20 displaces the latter in the direction corresponding to the engagement of the pawl 32 with the ratchet wheel 30, an engagement which determines by means of the link 29 the disengagement of the pawl 26 and of the toothed sector 25. It follows that the spring 18 can then freely exert its action on the arm 15 carrying the disc 12 of the driving wheel 1 and draw the latter in the direction corresponding to the high speeds.

It should be remarked that, in the application described, the hooks of the driving arms are almost in contact on the side corresponding to low speeds when the two centres O and O' are at their greatest distance apart. But these low speeds are not utilized in this application and it is only the driving arm which has the highest speed which controls the transmission.

In Fig. 12 a modification of the arrangement as applied to a bicycle is shown. In this construction the driving wheel 1 carries two guiding rods, of which one 41 slides in a guide 42 and the other 40 carries at one end a piston 43 of a liquid brake. The brake consists of a cylinder 44 filled with a viscous liquid such as oil, glycerine etc. in which the piston can be displaced, and is constantly urged towards the left by a spring 45. Any movement of the piston causes the passages of a certain quantity of liquid in the pipe 46 which carries a cock 47 adapted to take three positions (1) completely open, (2) completely closed, (3) leaving a narrow passage. This latter is the normal working position.

The action of the apparatus is as follows:

When the force exerted by the cyclist is normal, that is to say, when running on the level, the resistance offered to the movement of the piston by the spring 45 and the cock 47 is equal to the tension of the chain 2 and, consequently, the driving wheel 1 remains in the position of normal speed, the chain tightening wheel occupying the position 48. But when the cyclist is going uphill the force exerted becomes greater, the tension of the chain 2 overcomes the resistance of the brake, and the piston 43 is displaced in the direction of the arrow until the wheel 1 has taken a position corresponding to a speed gear such that a balance is again established between the tension of the chain and the resistance of the brake. In this latter position the tension of the driven side 2' of the chain is ensured by the tightening wheel which has taken the position 49.

If the slope of the hill becomes less the tension of the chain 2 diminishes and the piston moves in the opposite direction to re-establish again the balance.

The control of the most suitable gear is consequently made without any action of the cyclist. It should be remarked that the only regulation to be made consists in adapting the orifice of the passage of the cock 47 to the force of the person who uses the machine.

The open position of the cock has been provided for the case in which the machine running at reduced speed, the cyclist wishes to return to the higher speed. He then opens the cock 47 by means of the lever system 50; the liquid can then circulate freely in the pipe 46 and the spring 45 brings the driving wheel 1 to its original position.

The closed position of the cock will allow the cyclist to fix invariably the position occupied by the piston and, consequently, the speed gear of the machine which will act then as a machine without change speed gear, as long as the cock remains in this position.

The applications described, as applied to a bicycle, utilize the high speeds situated above the horizontal line I—I of the diagrams of Figs. 2 and 3. But the low velocities situated below this line could equally be utilized and present a greater regularity.

If we consider for this purpose the driving circle I with centre O and the driving circle 7 with center O', and if we place on the circle I at the angles of a regular polygon, for example at the six angles $a\,b\,c\,d\,e\,f$ of a hexagon driving arms 5 the length of which each is equal to the radius of the circles I and 7, it is seen that the lowest speeds obtained on the circle 7 are found in the part $d'\,e'$ which is traversed when the end of the driving arm mounted on the circle I passes from the point $d$ to the point $e$.

When the centre O' of the circle 7 is brought nearer to the centre O of the circle I, the geometric loci of the points $d'$ and $e'$ are constituted by two circular arcs described respectively about the points $d$ and $e$ as centres; for each relative position of the two circles the lowest speeds realized will be always included in the curved triangle $O, e\,f$.

When the two centers O and O' coincide the arcs $d\,e$ and $d'\,e'$ are equal and the secondary speed of the driven wheel becomes regular and equal to the speed of the driving wheel. Conversely, if the centre O' coincides with the point $c$ of the circle I, the arc $d'\,e'$ is reduced to a single point which coincides with the centre O and in this case the driven speed is zero.

The diagram shown in Fig. 7 shows that the speed curve presents a very great regularity in the hatched portion, particularly between the two points $d$ and $e$ even when the two centres are at their maximum distance apart.

Fig. 6 shows an arrangement for practically utilizing this result.

Assuming, as explained previously, that several driving arms may be simultaneously engaged, which would prevent any movement, it is necessary to hide the teeth of the driven wheel so as only to uncover the part which is to be utilized.

The hooks of the driving arms slide on the screen during the rotation of the driving wheel and engage in the teeth or leave these teeth along a curve which terminates the ends of the screen. Assuming that the distance during which the engagement is effected is variable with the distance apart of the centres O and O', it is necessary that the ends of the screen should automatically place themselves in the corresponding position.

For this purpose the screen consists of two parts 33, 34 which can turn freely about an axis perpendicular to the plane of the wheel 7, passing through the centre O' of the latter, the two parts of the screen opening and closing like the two blades of a pair of scissors; two stationary pins 35 and 36 disposed at the upper part of each of the halves of the screen ensure this movement by engaging in two corresponding grooves connected with the frame and parallel to the curves $O\,e$ and $O\,f$.

By means of this arrangement, the approach or withdrawal of the two centres O and O' causes automatically a suitable opening of the screen in order to make use of the lowest possible speed.

Zero speed can be obtained theoretically when the centre O' of the circle 7 coincides with the point $c$ of the circle I. At this moment all the hooks of the driving arms would be superimposed at the centre O, but this is practically impossible since these hooks have a definite thickness and lie in the same vertical plane. Consequently, it is necessary to realize zero speed before the points O' and $c$, coincide.

For this purpose the pins 35, 36 are placed sufficiently far from the ends of the screen and the grooves of the frame are disposed so that the curves at the ends of the screen are completely superimposed shortly before the limiting position is attained. The teeth of the wheel 7 are then entirely hidden and no movement can be produced.

Figure 9:
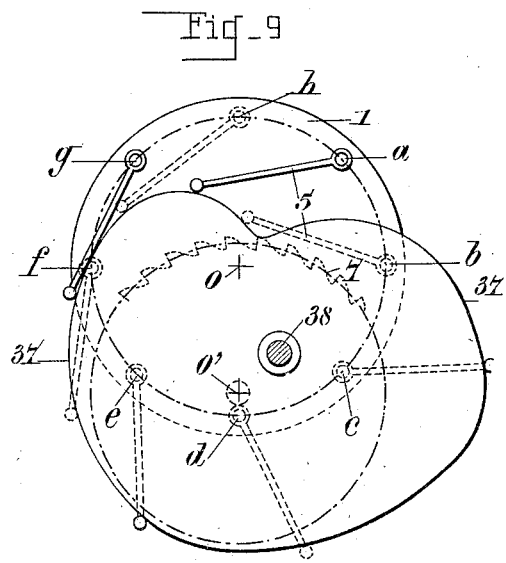
Figure 8:
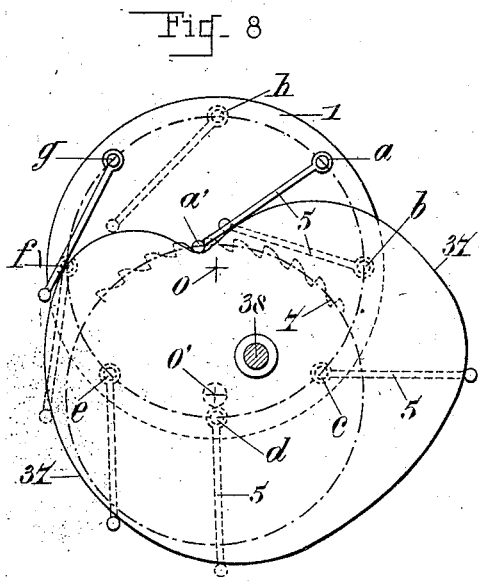
Figure 10:
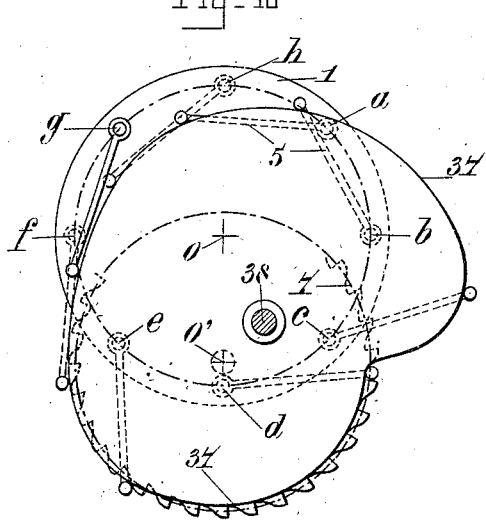

In Figs. 8, 9 and 10 a particular application of the system is shown by which all the possible changes of speed can be utilized or the movement entirely stopped.

A cam 37 is provided, the contour of which is such that, according to the position into which it has been rotated about an axle 38, the hooks of the driving arms 5, articulated at $a\,b\,c\,d\,e\,f\,g\,h$ on the driving wheel 1, can engage with the teeth of the driven wheel 7 only in the part corresponding to the lowest speed (Fig. 8), or in the part corresponding to the highest speed (Fig. 10), or remain entirely out of engagement with these teeth (Fig. 9).

The system of changing progressively and automatically the speed, which forms the object of the present invention, is not limited in its application to automobile vehicles and cycles, but can be applied also to stationary machines, such as machine tools. The system is also applicable for controlling the speed of hoisting apparatus, in which case available the power can be regulated so as to conform to the stress necessary to overcome the resistance offered.

A very interesting industrial result can be obtained by duplicating the arrangement, so as to cause the low and high speeds of the circles of the double arrangement to coincide. Assuming that each of the two parts of the arrangement can give variations of speed between 1 and 10, the combined action will give variations of speed between 1 and 100.

Having now particularly described and ascertained the nature of my said invention and in what manner the same is to be performed, I declare that what I claim is:

1. An automatic and progressive change speed gear comprising, a movable drive wheel, a fixed, driven toothed wheel, a plurality of arms, pivoted on the drive wheel and terminating in hooks, springs for pressing the hooks against the driven wheel, the wheels being relatively displaceable to vary the distance between their centers, and means for assuring automatic spacing of the wheel centers, whereby to accommodate the driving effort, to the resistance to be overcome.

2. A change speed gear according to claim 1, said toothed wheel having teeth, so formed that one side can be seized by said hooks, and the other side permits said hooks to slide thereover.

3. An automatic and progressive change speed gear comprising a displaceable drive wheel, driven by a pedal operated chain, a fixed driven wheel positioned on an axis, a central slot in the drive wheel received by the axis, a spring for biasing the drive wheel away from the driven wheel, in combination with means for automatically so spacing the centers of the two wheels, as to accommodate the driving effort, to the resistance to be overcome.

4. An automatic and progressive change speed gear comprising a displaceable drive wheel, a fixed, toothed driven wheel, hook ended arms positioned on the drive wheel, in combination with a fluid brake for controlling the relative position of said wheels, said brake comprising a cylinder, a piston in the cylinder, a rod connected to the piston and to the drive wheel, a coil spring in the cylinder and bearing against the piston, a conduit, controlled by a valve, and connecting the ends of the cylinder, a chain for driving the drive wheel, the tension of said chain being opposed by the spring in the cylinder.

5. An automatic and progressive change speed gear comprising a displaceable drive wheel, a fixed, toothed driven wheel, hook ended arms positioned on the drive wheel, in combination with a fluid brake for controlling the relative position of said wheels, said brake comprising a cylinder, a valve controlled conduit connecting the ends of the cylinder, the valve being controlled by the operator, for predetermining the change of speed, and for permitting a return of the device to the position of maximum speed.

6. An automatic and progressive change speed gear, comprising, a displaceable drive wheel, hooked arms positioned on the drive wheel, a fixed toothed, driven wheel, and means for automatically regulating the distance between the wheels, the driven wheel being furnished with a screen of any appropriate form, one portion of which covers the teeth, another portion of which permits engagement of the hooked arms with the teeth.

7. An automatic and progressive change speed gear, comprising, a displaceable drive wheel, hooked arms positioned on the drive wheel, a fixed toothed driven wheel, and means for automatically regulating the distance between the wheels, the driven wheel being furnished with a screen, of cam shape, rotatable on an axis eccentric to that of the toothed wheel, for assuming any desired position.

In testimony whereof I have signed my name to this specification.

LOUIS JOSEPH LÉCHENAUX.